United States Patent [19]
Akamatsu et al.

[11] Patent Number: 5,949,293
[45] Date of Patent: Sep. 7, 1999

[54] INTEGRATED CIRCUIT FOR MEASURING THE DISTANCE

[75] Inventors: Norio Akamatsu; Hideshi Kanaoka, both of Tokushima, Japan

[73] Assignee: Japan System Development Co., Ltd., Tokushima, Japan

[21] Appl. No.: 09/023,771

[22] Filed: Feb. 13, 1998

[30] Foreign Application Priority Data

Feb. 18, 1997 [JP] Japan .................................... 9-032507
Jan. 13, 1998 [JP] Japan ................................. 10-004852

[51] Int. Cl.$^6$ .............................. H03B 5/18; G01V 3/11; G01N 27/00
[52] U.S. Cl. ................................ 331/65; 331/68; 331/74; 331/96; 331/117 D; 331/108 D; 324/236; 324/327; 324/207.16; 345/179
[58] Field of Search ................................... 331/64, 65, 68, 331/74, 96, 108 D, 117 R, 117 FE, 117 D, 107 SL, 181, 187; 324/207.15–207.19, 207.26, 236, 327; 340/941; 345/179; 361/179–181

[56] References Cited

U.S. PATENT DOCUMENTS 4,042,876 8/1977 Visioli, Jr. ............................. 324/34 D

FOREIGN PATENT DOCUMENTS 1-253137 10/1989 Japan .

*Primary Examiner*—David Mis
*Attorney, Agent, or Firm*—Wenderoth, Lind & Ponack, L.L.P.

[57] ABSTRACT

An integrated circuit for measuring the distance houses an oscillator in a package. Further, a plane inductor is provided on the surface of the package housing the oscillator. The plane inductor is connected to the oscillator so as to specify a frequency of the oscillator. If conductive material approaches the surface of the package, the frequency of the oscillator is varied by means of the plane inductor. The approaching distance of the conductive material is detected by detecting the frequency of the oscillator. The conductive material is mostly metal, however, the integrated circuit for measuring the distance can measure the approaching distance of non-metal conductive material such as conductive liquid.

12 Claims, 16 Drawing Sheets

INTEGRATED CIRCUIT FOR MEASURING THE DISTANCE

BACKGROUND OF THE INVENTION

The present invention relates to an integrated circuit for measuring the distance which can accurately detect the position with respect to conductive material such as metal. Technology of detecting the position with respect to the conductive material has been applied to various machines in the industrial field. Therefore, an integrated circuit for measuring the distance of the present invention can be widely applied in the whole industrial field. If the integrated circuit for measuring the distance of the present invention is used for measuring the position of a robot arm, highly precise control of the robot arm can be achieved. For this reason, the integrated circuit for measuring the distance of the present invention can be applied to all manufacturing processes performed by using a robot. Further, when the integrated circuit for measuring the distance of the present invention is stored within a position detector, highly precise detection of position can be realized.

In general, an electronic circuit is divided into two circuits, a lump circuit and a distributed circuit. The lump circuit is described by an ordinary differential equation and the distributed circuit is described by a partial differential equation. Therefore, the lump circuit is completely different from the distributed circuit in the mathematical expression. The lump circuit is used for almost all prior art apparatuses for measuring the distance. The distributed circuit is used in the integrated circuit for measuring the distance of the present invention.

In the lump circuit, inductance, capacitance and resistance thereof are constant at all times and their values are not varied even though a frequency is varied. On the other hand, in the distributed circuit, it is possible that capacitance and inductor-thereof are equivalently varied by the skin effect when the frequency is varied. The integrated circuit for measuring the distance of the present invention utilizes the variation of the circuit parameters of the distributed circuit. The present inventor can not find any apparatuses for measuring the distance utilizing the distributed circuit except the integrated circuit for measuring the distance of the present invention.

In an apparatus for measuring the distance, there are two methods, a method of utilizing an optical device and a method of utilizing an electro-magnetic device. A prior art apparatus for measuring the distance, which is the most similar to the present invention, uses a method of detecting the position electro-magnetically. In detecting the position electro-magnetically, there are two methods, a method of using electro-magnetic induction and a method of using electro-statical coupling. These methods comprises the lump circuit. The integrated circuit for measuring the distance of the present invention comprises the distributed circuit. Therefore, the integrated circuit for measuring the distance of the present invention is substantially different from the prior art methods. A prior art apparatus for measuring the distance is described below.

The prior art electro-magnetic apparatus for measuring the distance uses an inductor which is formed by winding wires three-dimensionally. In the ordinary way, the inductor is formed by winding copper wires around magnetic material such as ferrite.

Turning to FIG. 1, an example of an apparatus for measuring the distance using a three-dimensionally distributed inductor is shown. The three-dimensionally distributed inductor is formed by winding coils around magnetic material 21. An alternating current flows into the coils. When the ferrite 22 approaches the three-dimensionally distributed inductor, the current flowing in the coils is varied. The distance between the ferrite 22 and the magnetic material 21 is detected by measuring the variation of the current.

The apparatus for measuring the distance electro-magnetically by using the coils has the following drawbacks.

(1) A comparatively large amount of electric power is required for generating magnetic flux by flowing current in the coils, and therefore a large equipment for electric power source is required.

(2) Calorific value becomes large because of a large amount of current flowing in the coils.

(3) Noises are generated by the magnetic flux leakage.

(4) The cost is high because a process of winding conductive wires is required.

(5) It is impossible to make the apparatus small-sized because of winding the conductive wires three-dimensionally.

(6) Measurement precision can not be improved because the magnetic circuit comprises the magnetic material such as ferrite.

(7) High speed measurement can not be obtained because of the use of low frequency current.

In the integrated circuit for measuring the distance according to the present invention, an alternating current, which changes periodically, flows into a two-dimensionally distributed plane inductor. In general, there are two types in the two-dimensionally distributed plane inductor, a meander type and a spiral type. Turning to FIG. 2, an example of the two-dimensionally distributed plane inductor 1 of the meander type located on the surface of an insulator 3 is shown. The two-dimensionally distributed plane inductor 1 is formed by using conductive material such as copper. The insulator 3 is ordinarily formed by printed-circuit-board material such as paper-phenol and glass-epoxy resin.

Turning to FIG. 3, an example of the two-dimensionally distributed plane inductor 31 of the spiral type located on the surface of the insulator 33 is shown. Current of an extremely high frequency flows in the two-dimensionally distributed plane inductor used for the integrated circuit for measuring the distance of the present invention. In ordinary circumstances, a high frequency of 30 MHz to 1000 MHz is used. When an extremely high frequency is used, the current flows only on the surface of a conductor and does not flow inside of that. This phenomenon is called "skin effect". Since the high frequency is used to measure the distance at high speed, only phenomenon generated around the surface of the plane inductor becomes usable by the skin effect. A comparison between the conductive material approaching the surface of the two-dimensionally distributed plane inductor and that approaching the surface of the three-dimensionally distributed inductor is described below.

In an apparatus for measuring the distance using a method of bringing the conductive material close to all surfaces of the three-dimensionally distributed inductor, the structure thereof becomes extremely complicated. Therefore, in the three-dimensionally distributed inductor, only one out of the six surfaces is usable and inductances of the inductors on the other surfaces can not be varied. However, it can be realized by using a simple structure to bring the conductive material close to the surface of the two-dimensionally distributed plane inductor. When the distance between the conductive material and the plane inductor is reduced, they are electro-statically coupled with each other. It is impossible to efficiently use all of the electro-statical coupling generated on the surfaces of the three-dimensionally distributed inductor, but possible to efficiently use those on the surface of the two-dimensionally distributed plane inductor. The inductance of the inductor is reduced by cancellation of electromagnetically induced current. A changing rate of the inductance of the three-dimensionally distributed inductor is less than that of the inductance of the two-dimensionally distributed inductor. Hence, higher sensitivity can be obtained by using the two-dimensionally distributed plane inductor than by using the three-dimensionally distributed inductor. As a result, reduction in measuring time can be obtained by flowing high frequency current in the two-dimensionally distributed plane inductor, and a highly precise integrated circuit for measuring the distance can be realized by efficiently utilizing the electro-statical induction generated on the surface of the two-dimensionally distributed inductor.

There is a method of detecting the position optically by using an optical device such as a laser. However, the integrated circuit for measuring the distance of the present invention measures the position electro-magnetically, and so does not use any optical techniques. An apparatus for measuring the distance with the optical device has the following drawbacks.

(1) A large amount of electric power is required for a luminous and a light receiving elements.
(2) The luminous and light receiving elements make the structure complicated, and therefore it is difficult to make the apparatus for measuring the distance small-sized.
(3) The cost is high because cheap silicon can not be used for manufacturing the luminous and light receiving elements.
(4) It is difficult to hit the light emitted from the luminous element on the light receiving element perfectly.

In an apparatus for measuring the distance using the three-dimensionally distributed inductor, the magnetic flux generated by current flowing in the inductor is used. When the conductive material approaches the three-dimensionally distributed inductor, the generated magnetic flux passes through the conductive material and eddy current flows in the conductive material by means of an electro-magnetic induction phenomenon. By this phenomenon, the three-dimensionally distributed inductor is electro-magnetically coupled to the conductive material. The strength of electro-magnetic coupling between the three-dimensionally distributed inductor and the conductive material is in inverse proportion to the distance between the same. The strength of the generated electro-magnetic coupling is measured by detecting the current flowing in the inductor. Therefore, the distance between the three-dimensionally distributed inductor and the conductive material can be measured by results of measuring the current flowing in the inductor. Hence, it is the generated magnetic flux that the three-dimensionally distributed inductor can use as an integrated circuit for measuring the distance. Consequently, when using the three-dimensionally distributed inductor, only one surface of the three-dimensionally distributed inductor, which the generated magnetic flux goes toward, can be used as an apparatus for measuring the distance, and the other surfaces cannot be used. Therefore, large current is required for generating the strong magnetic flux in raising the sensitivity of the apparatus for measuring the distance. However, if the large current flows in the inductor, the consumption of electric power becomes large. When the consumption of electric power becomes large, the apparatus for measuring the distance has the following drawbacks.

(1) A large power supply is required.
(2) When electric power consumption becomes large, calorific value becomes large and temperature becomes high. As a result, the surrounding electronic circuits may not work normally.
(3) Surrounding machines are affected by the noises generated by the strong magnetic flux.

According to the above-mentioned consideration, reducing the current flowing in the inductor and raising the sensitivity are required for manufacturing a highly precise apparatus for measuring the distance. For this reason, the electro-statical coupling, which requires a small amount of current, is more preferable than the electro-magnetic coupling which requires a large amount of current in respect of efficiency. Namely, the inductor for measuring the distance is electro-statically coupled to the conductive material. The inductor for measuring the distance has a two-dimensional structure so as to efficiently utilize the electro-statical coupling. When bringing the conductive material close to the two-dimensionally distributed plane inductor, the electro-statical coupling becomes the maximum, the sensitivity of the plane inductor for measuring the distance is increased, and then the consumption of electric power becomes the minimum. When the two-dimensionally distributed plane inductor is electro-statically coupled to the conductive material, a conductive part of the two-dimensionally distributed plane inductor and the conductive material become capacitors equivalently. Namely, the conductive part of the two-dimensionally distributed plane inductor becomes one electrode of the distributed capacitor and the conductive material becomes the other electrode of that. In general, when the frequency of current flowing in a circuit is increased, the current flowing in the capacitor is increased and the current flowing in the plane inductor is decreased. When the distance between the two-dimensionally distributed plane inductor and the conductive material is short, the inductance of the two-dimensionally distributed inductor is equivalently decreased because of the increased capacity of the distributed capacitor. Namely, the frequency of an oscillator is increased because of the decreased induction. Consequently, the variation of the distance between the two-dimensionally distributed plane inductor and the conductive material can be measured by detecting the frequency variation.

The apparatus for measuring the distance is mostly housed internally in a robot and a machine when being used. The requirements, which the apparatus for measuring the distance must satisfy, are described below.

(1) The structure is simple.
(2) The cost is low.
(3) The size is small and the weight is light owing to limited mounting space.
(4) The measurement sensitivity is high.
(5) It is possible to measure at high speed.
(6) It is possible to form an integrated circuit.
(7) The noises generated from the integrated circuit for measuring the distance is small.
(8) The consumption of electric power is small.

An object of the present invention is to provide the apparatus for measuring the distance satisfying the above-mentioned requirements.

The above and further object and features of the invention will more fully be apparent from the following detailed description with accompanying drawings.

SUMMARY OF INVENTION

An integrated circuit for measuring the distance comprises an oscillator housed in a package and a plane inductor provided on the surface of the package housing the oscillator, and connected to the oscillator so as to specify a frequency of the oscillator.

When conductive material approaches the surface of the package of the integrated circuit, the frequency of the oscillator is varied by means of the plane inductor. The approaching distance of the conductive material can be detected by measuring the frequency variation. The conductive material is mostly a metal, however, the integrated circuit for measuring the distance of the present invention can measure the approaching distance of non-metal conductive material such as conductive liquid.

In the integrated circuit for measuring the distance, the frequency of the oscillator is normally used greater than 30 MHz, preferably, 30 MHz to 1000 MHz.

In comparing a prior art apparatus using the three-dimensionally distributed inductor with the integrated circuit for measuring the distance of the present invention in which the two-dimensionally distributed plane inductor is located on the surface of the package of the integrated circuit, the integrated circuit for measuring the distance of the present invention has the following features.

(1) The plane inductor of the integrated circuit for measuring the distance of the present invention can be manufactured by using a printing technique. For this reason, the plane inductor can be mass-produced at low cost. On the other hand, in order to manufacture the three-dimensionally distributed inductor, the process of winding conductive wires is required, and therefore the cost becomes high.

(2) The two-dimensionally distributed plane inductor can be small-sized and thinly provided on the surface of the package of the integrated circuit because of its plane form. For this reason, it is possible to make the overall integrated circuit for measuring the distance small-sized. On the other hand, it is difficult to make the three-dimensionally distributed inductor small-sized.

(3) The two-dimensionally distributed plane inductor can utilize the electro-statical coupling efficiently because of its plane structure. Accordingly, the consumption of electric power can be reduced. On the other hand, the three-dimensionally distributed inductor utilizes an electro-magnetic induction instead of the electro-statical coupling because an area capable for utilizing the electro-statical coupling is small. Accordingly, the consumption of electric power becomes large.

(4) In practice, the integrated circuit for measuring the distance of the present invention can be widely applied in the industrial field because the conductive material such as metal is used for various industrial machines.

(5) The electro-statical coupling generated between the plane inductor and the conductive material is close and tight because the plane inductor is distributed two dimensionally. Therefore, the inductance L of the plane inductor varies equivalently, and so can be utilized efficiently. Hence, the measurement sensitivity becomes high.

(6) The integrated circuit for measuring the distance can be widely applied in the manufacturing industry because of the simple structure, light weight and low cost.

(7) It is possible to make the resolving power of measuring the distance high because the plane inductor is located on a plane.

DETAILED DESCRIPTION OF THE INVENTION

In the integrated circuit for measuring the distance of the present invention, the measurement sensitivity is preferable even when the inductance L of the plane inductor is small. The two-dimensionally distributed plane inductor of the small inductance is located on the upper surface of the package of the integrated circuit. One of the features which the integrated circuit for measuring the distance of the present invention has is that the two-dimensionally distributed plane inductor is located on the upper surface of the package of the integrated circuit.

Figure 1:
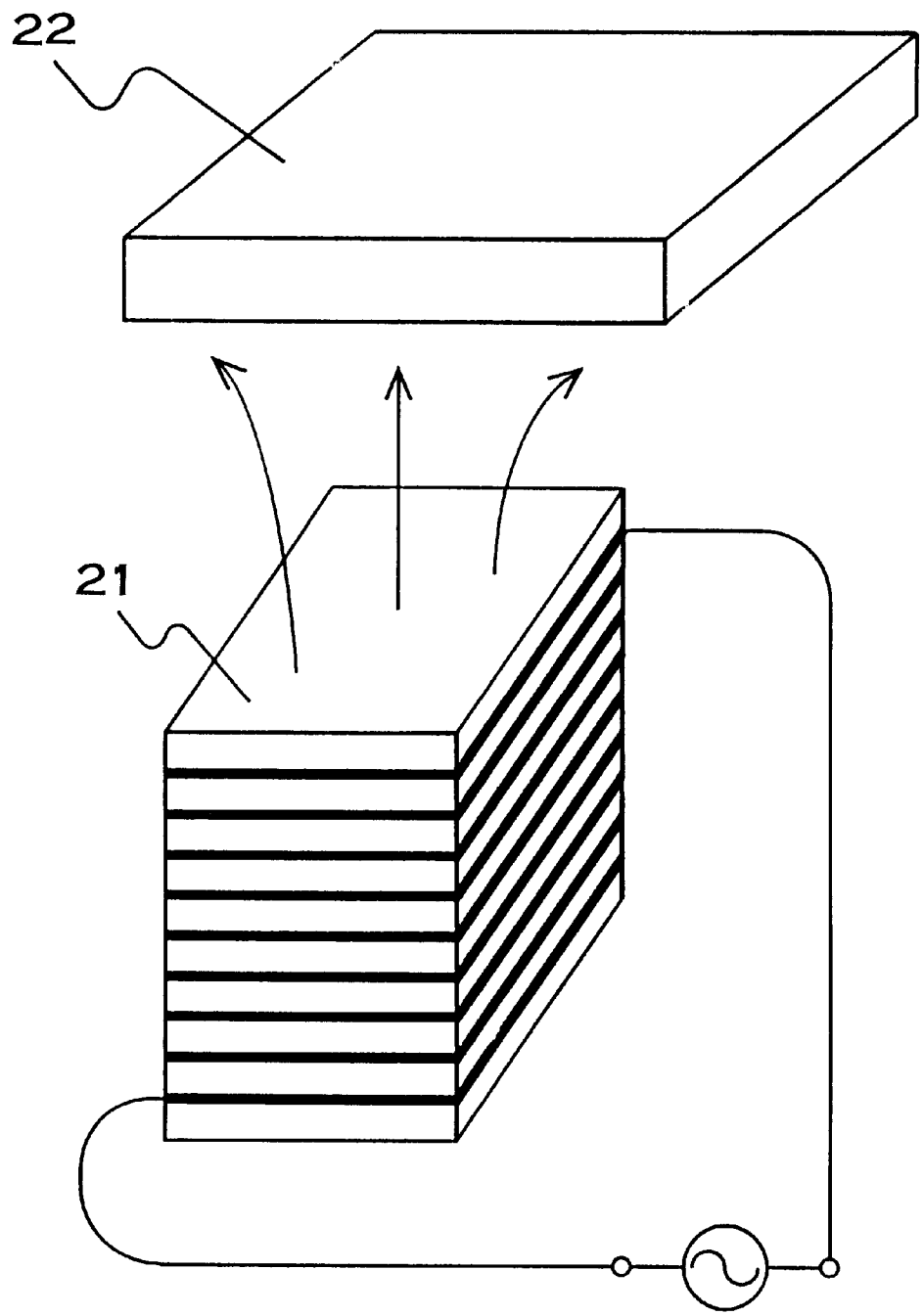
FIG. 1 is an oblique view of a prior art apparatus for measuring the distance using an inductor formed by winding conductive wires three dimensionally.
Figure 2:
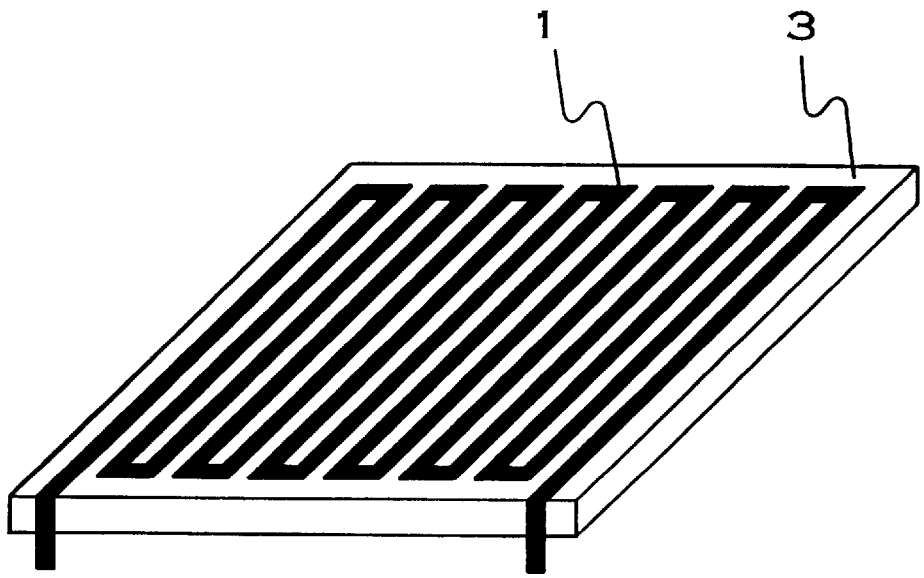
FIG. 2 is an oblique view of a two-dimensionally distributed plane inductor of meander type.
Figure 3:
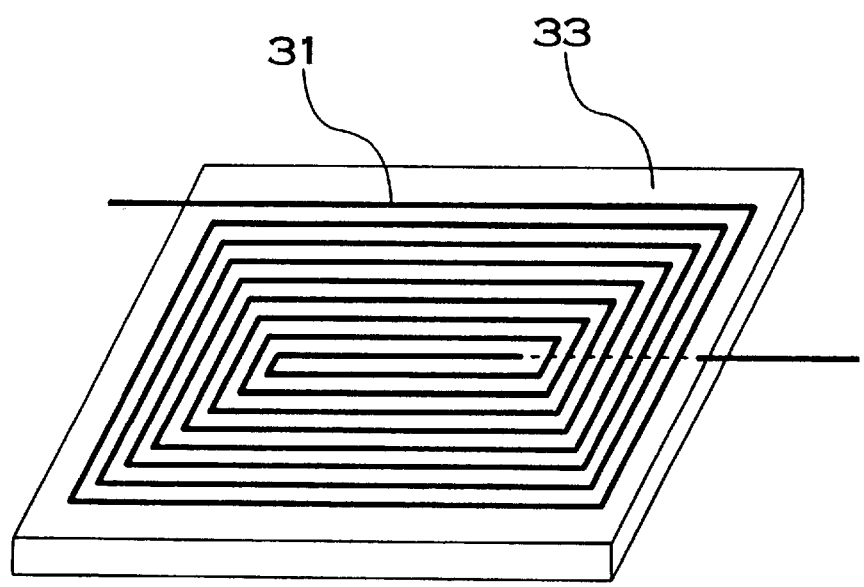
FIG. 3 is an oblique view of a two-dimensionally distributed plane inductor of spiral type.
Figure 4:
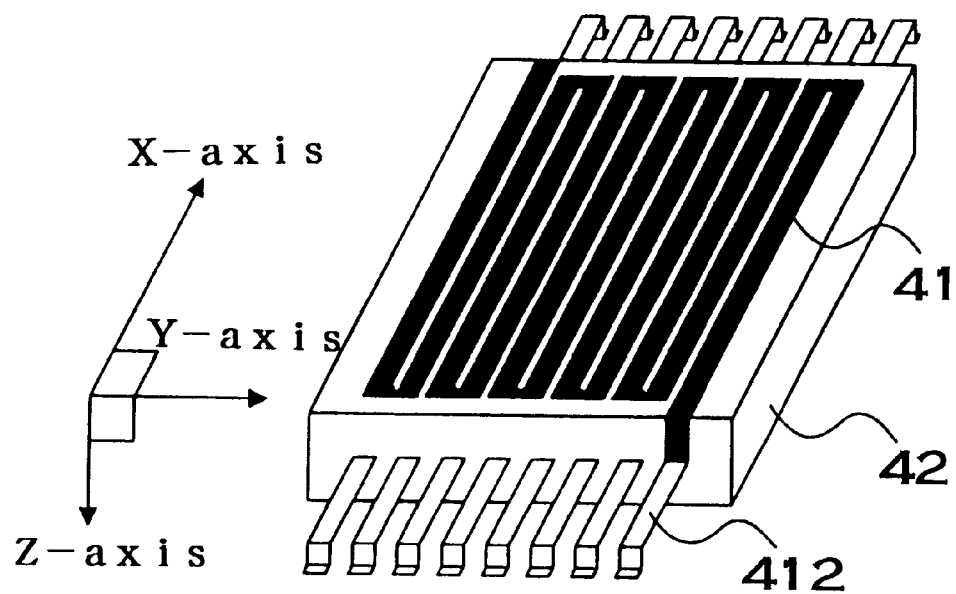
FIG. 4 is an oblique view of a plane inductor provided on the upper surface of an integrated circuit for measuring the distance of an embodiment of the present invention.

Turning to FIG. 4, a two-dimensionally distributed plane inductor 41 located on an insulator of the upper surface of an integrated circuit 42 is shown. The integrated circuit 42 is covered with a package such as plastic and ceramic. The two-dimensionally distributed plane inductor 41 is provided on these insulators. A terminal of the two-dimensionally distributed plane inductor 41 is connected to a pin 412 of the integrated circuit. In this specification, X, Y and Z axes are defined as shown in FIG. 4 in order to explain current flowing in the plane inductor of meander type.

Figure 5:
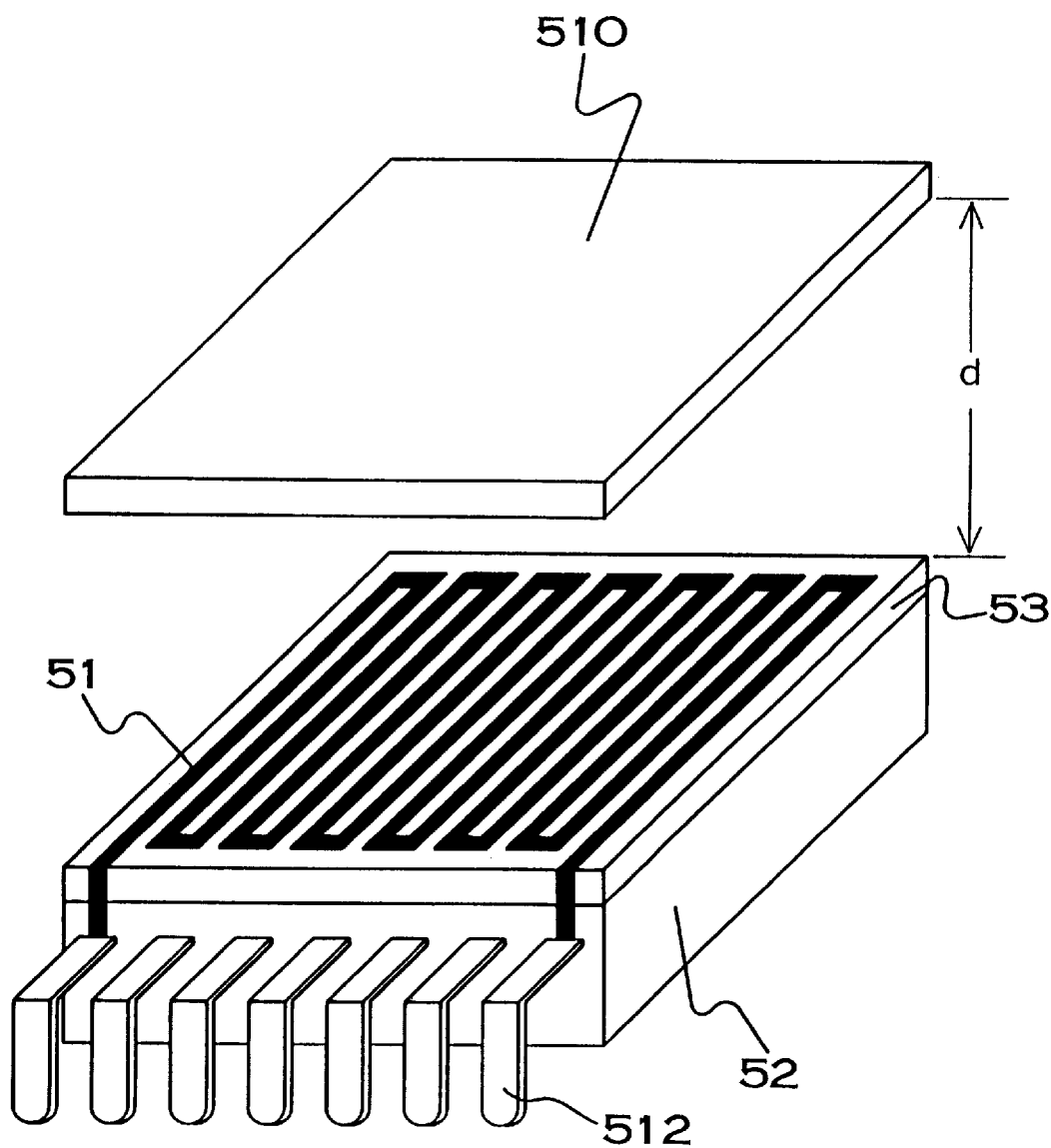
FIG. 5 is an oblique view showing a state that conductive material approaches a plane inductor provided on an insulator on the upper surface of the integrated circuit for measuring the distance of another embodiment of the present invention.

Turning to FIG. 5, an integrated circuit for measuring the distance in which an insulator 53 is provided on the surface of an integrated circuit 52 and a two-dimensionally distributed plane inductor 51 is provided on the insulator 53 is shown. Further, FIG. 5 shows a state that conductive material 510 approaches the two-dimensionally distributed plane inductor 51. The distance between the conductive material 510 and the two-dimensionally distributed plane inductor 51 is represented by a symbol d. When the conductive material 510 approaches the two-dimensionally distributed plane inductor 51, current flowing in the two-dimensionally distributed inductor 51 is varied. The distance between the conductive material 510 and the two-dimensionally distributed plane inductor 51 can be detected by measuring the frequency variation of an oscillator stored in the integrated circuit.

Figure 6:
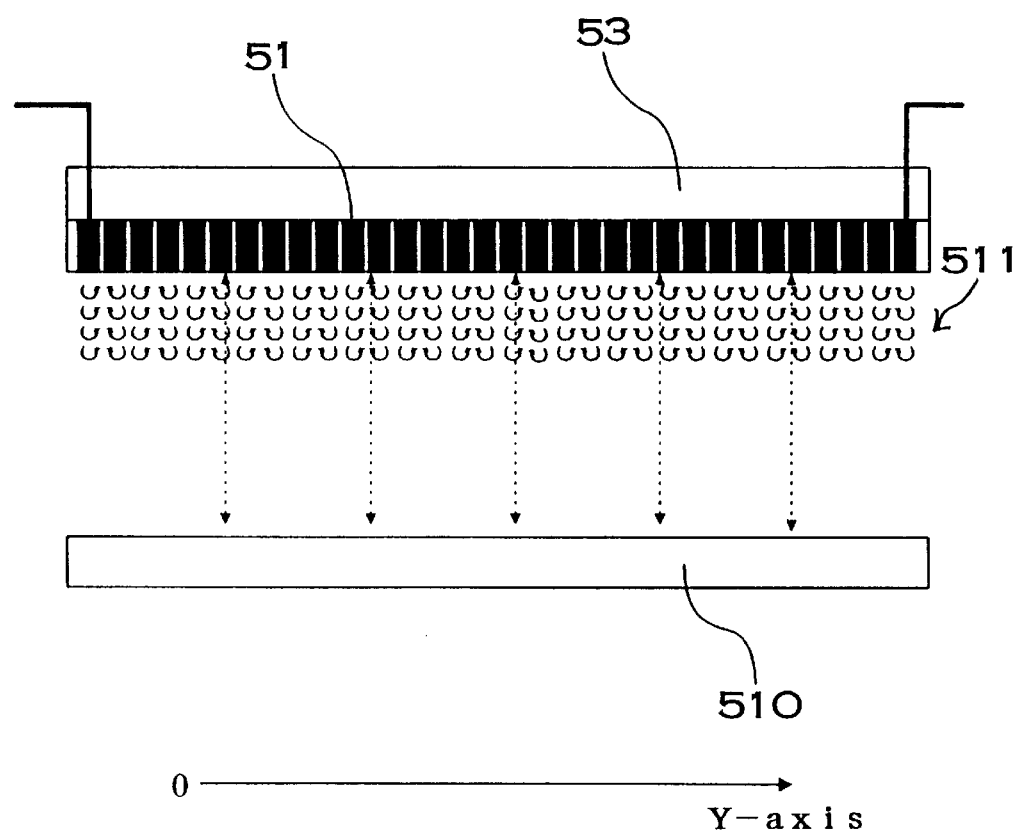
FIG. 6 is a cross-sectional view of a plane inductor of the integrated circuit for measuring the distance and conductive material in FIG. 5 in the Y-axial direction.

FIG. 6 shows an electro-statical induction which is generated when the distance between the conductive material 510 and the two-dimensionally distributed inductor 51 is long. FIG. 6 shows a cross-sectional view in the Y-axial direction and it is the reverse of FIG. 5. In FIG. 6, an arrow of the solid line shows the magnetic flux generated by current and an arrow of the broken line shows the electro-statical induction. Since the current flowing in the two-dimensionally distributed plane inductor 51 is small, the generated magnetic flux is small. The electro-statical induction is generated on the surface of the conductive material 510 by flowing current in the two-dimensionally distributed plane inductor 51. As shown in FIG. 6, when the distance d is long, the capacitance value of the distributed capacitor 511 generated between the conductive material 510 and the two-dimensionally distributed plane inductor 51 is small because of the small electro-statical induction effect. The magnetic flux is generated by flowing current in the two-dimensionally distributed plane inductor 51, however, the electro-magnetic coupling is small because the distance d is long.

Figure 7:
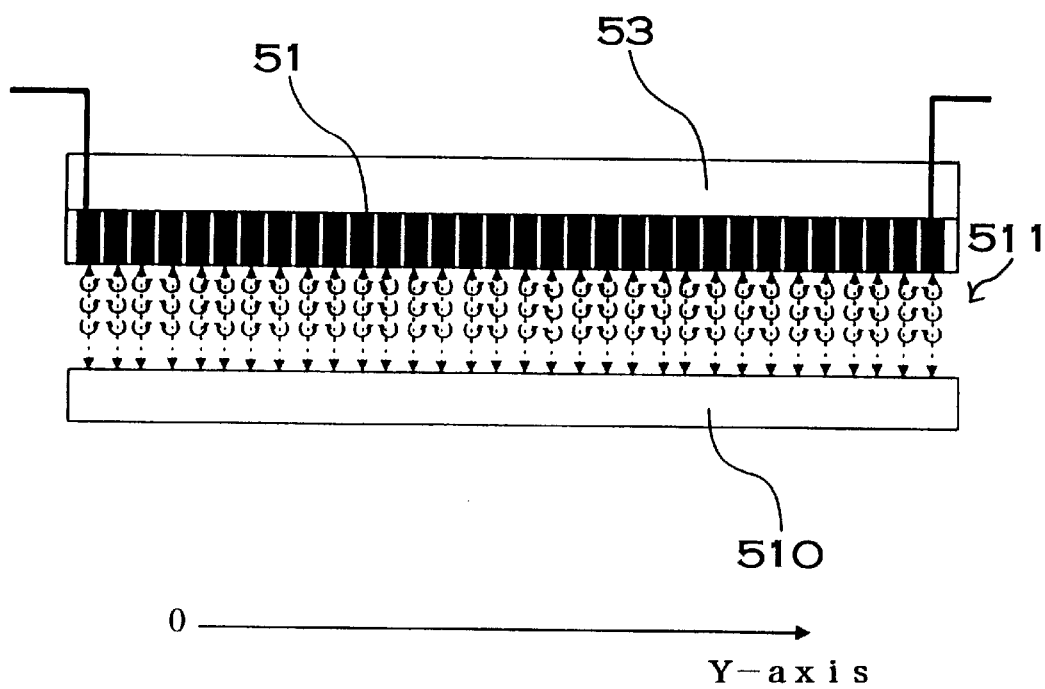
FIG. 7 is a cross-sectional view showing a state that conductive material approaches a plane inductor of the integrated circuit for measuring the distance in FIG. 6.

FIG. 7 shows the electro-statical induction which is generated when the distance d between the conductive material 510 and the two-dimensionally distributed plane inductor 51 is short.

In FIG. 7, an arrow of the solid line shows the magnetic flux generated by current and an arrow of the broken line shows electro-statical induction. As shown in FIG. 7, when the distance d is short, the two-dimensionally distributed plane inductor 51 is electro-statically and strongly coupled with the conductive material 510. Since the electro-statical induction is large, the capacitance value of the distributed capacitor 511 generated between the conductive material 510 and the two-dimensionally distributed plane inductor 51 is large.

Figure 8:
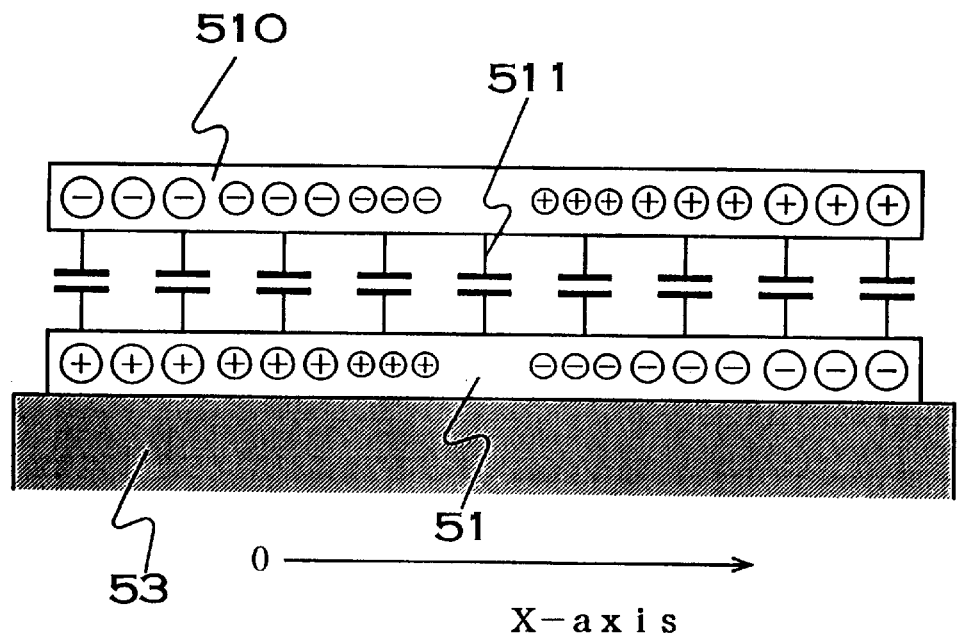
FIG. 8 is a cross-sectional view of a plane inductor of the integrated circuit for measuring the distance and conductive material in FIG. 5 in the X-axial direction.

Turning to FIG. 8, the distributed capacitor 511 constructed between the conductive material 510 and the two-dimensionally distributed plane inductor 51 is shown. The X-axis shows the direction of current flowing in the two-dimensionally distributed plane inductor 51. FIG. 8 shows a cross-sectional view in the X-axial direction. The two-dimensionally distributed plane inductor 51 which is located on the insulator 53 is applied voltage, and therefore an electric charge is generated. The generated electric charge is represented by signs of plus (+) and minus (−). When the distance d between the conductive material 510 and the two-dimensionally distributed plane inductor 51 is short, the electro-statical induction is greatly generated, and then the capacitance of the distributed capacitor 511 generated between the conductive material 510 and the two-dimensionally distributed plane inductor 51 becomes large. Owing to the electro-statical induction phenomenon, the electric charge of an opposite sign with respect to the two-dimensionally distributed plane inductor 51 is induced in the conductive material 510. The electric charge induced into the conductive material 510 is represented by the plus (+) and minus (−) symbols.

Figure 9:
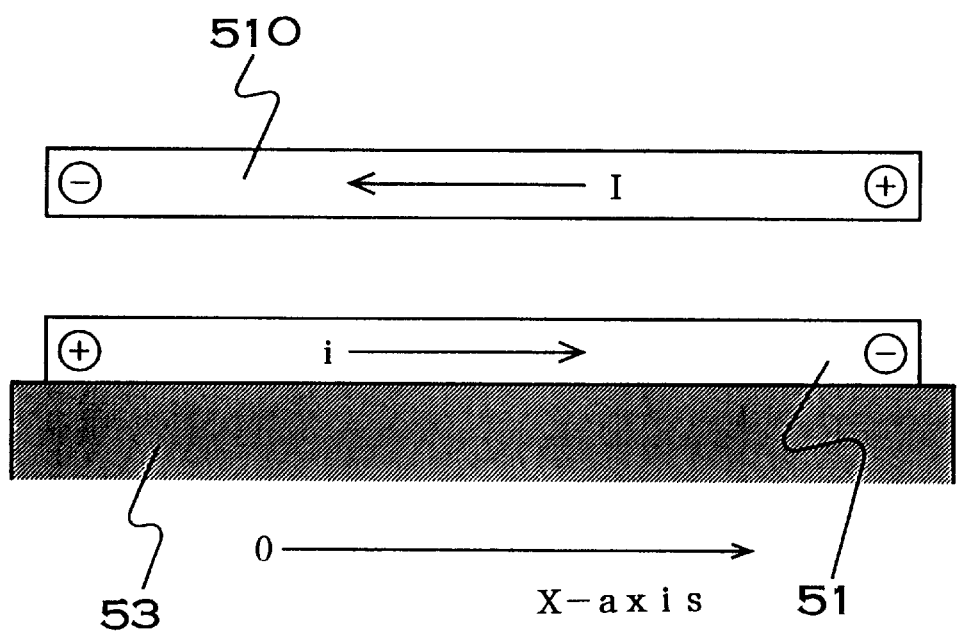
FIG. 9 is a schematic diagram showing current generated by an electric charge which is electro-statically induced to a plane inductor of the integrated circuit for measuring the distance and conductive material in FIG. 8.

FIG. 9 is a cross-sectional view of the conductive material 510 and the two-dimensionally distributed plane inductor 51 in the X-axial direction. The two-dimensionally distributed plane inductor 51 is located on the insulator 53. The current i flows in the two-dimensionally distributed plane inductor 51. By the electro-statical induction phenomenon, the electric charge of an opposite sign with respect to the two-dimensionally distributed plane inductor 51 is induced in the conductive material 510. The current flowing in the conductive material 510 is represented by a symbol I. The direction of the current I is the reverse of that of the current i. When the distance d is short, the current I flowing in the conductive material 510 is large. The current i flowing in the two-dimensionally distributed plane inductor 51 generates magnetic flux into the surrounding space, therefore the electro-magnetic coupling is occurred between the generated magnetic flux and the current, thereby forming self-inductance. The self-inductance corresponds to the inductance L of the two-dimensionally distributed plane inductor 51.

On the other hand, the current I flowing in the conductive material 510 also generates magnetic flux into the surrounding space. Since the direction of the current I is the reverse direction to the current i, the direction of the magnetic flux generated by the current I is the reverse direction to the magnetic flux generated by the current i. Therefore, the magnetic flux generated by the current i is cancelled by the magnetic flux generated by the current I, thereby the resultant magnetic flux little. Hence, the inductance L of the two-dimensionally distributed plane inductor 51 is equivalently reduced by the conductive material 510 approaching the two-dimensionally distributed plane inductor 51.

Namely, when the distance d between the conductive material 510 and the two-dimensionally distributed plane inductor 51 is reduced, the inductance L is reduced equivalently. In contrast with this case, when the distance d between the conductive material 510 and the two-dimensionally distributed plane inductor 51 is increased, the inductance L is equivalently increased. Consequently, the variation of the distance d can be detected by measuring the variation of the inductance L as the frequency variation of the oscillator. In the integrated circuit for measuring the distance according to the present invention, the distance d between the conductive material 510 and the two-dimensionally distributed plane inductor 51 can be detected by measuring the frequency f using the frequency counter 7 because the frequency f of the oscillator is varied when the inductance L is varied.

In general, when the frequency of the oscillatory circuit which is composed by an inductor and a capacitor is increased, the current flowing in the inductor is decreased and current flowing in the capacitor is increased. In the integrated circuit for measuring the distance of the present invention, the two-dimensionally distributed plane inductor 51 is used. Therefore, when the conductive material 510 approaches to the two-dimensionally distributed plane inductor 51, the conductive material 510 is electro-statically coupled to the two-dimensionally distributed plane inductor 51. As shown in FIG. 8, the two-dimensionally distributed plane inductor 51 becomes one electrode of the distributed capacitor 511 and the conductive material 510 becomes the other electrode of that, and therefore they are electro-statically coupled with each other. Accordingly, as shown in FIG. 9, when the distance between the conductive material 510 and the two-dimensionally distributed plane inductor 51 is reduced, the capacitance of the distributed capacitor 511 is increased. Therefore, when the frequency of current flowing in the circuit is high, the current flowing in the conductive material 510 through the distributed capacitor 511 is increased. The magnetic flux generated by the current flowing in the conductive material 510 and the magnetic flux generated by the current flowing in the plane inductor 51 are electro-magnetically coupled and cancelled each other. Consequently, the inductance of the two-dimensionally distributed plane inductor 51 is reduced equivalently. The frequency f of the oscillator constructed by the inductance L of the two-dimensionally distributed plane inductor 51 and the capacitance C of a lump capacitor is expressed by the following equation:

$$f \times f \times L \times C = (\tfrac{1}{2}\pi) \times (\tfrac{1}{2}\pi) \tag{1}$$

According to the above equation (1), when the inductance L of the plane inductor 51 is reduced, the frequency f of the oscillator is increased. The frequency f of the oscillator can be measured by using the frequency counter. When the conductive material 510 approaches the two-dimensionally distributed plane inductor 51 and the distance between them is reduced, the current flowing in the conductive material 510 is increased because the capacitance of the distributed capacitor 511 is increased. Accordingly, the electro-magnetic coupling is strengthened. The self-inductance L of the two-dimensionally distributed plane inductor 51 is reduced equivalently by cancellation effect of the current i and the reverse current I. Therefore, the variation of the distance between the conductive material 510 and the two-dimensionally distributed plane inductor 51 can be detected by measuring the variation of the frequency f of the oscillator.

Figure 10:
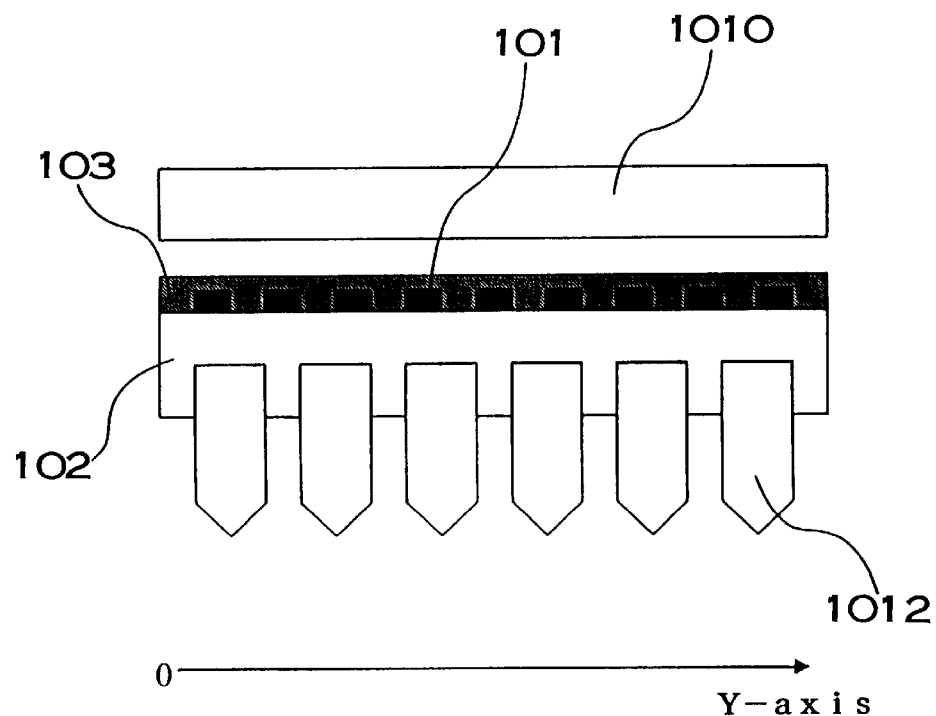
FIG. 10 is a cross-sectional view in the Y-axial direction in a case where an insulator covers a plane inductor of the integrated circuit for measuring the distance of another embodiment of the present invention.

FIG. 10 is a cross-sectional view of an integrated circuit 102 in the Y-axial direction. A pin 1012 of the integrated circuit is provided in the lower part of the integrated circuit 102 and ordinarily contacted to a printed-circuit-board. The two-dimensionally distributed plane inductor 101 is provided in the upper part of the integrated circuit 102. The two-dimensionally distributed plane inductor 101 is covered with the insulator 103. Since the plane inductor 101 shown in this figure is covered with the insulator 103, the conductive material 1010 does not contact with the plane inductor 101 directly when the conductive material 1010 approaches to the plane inductor 101.

When the conductive material 1010 approaches to the two-dimensionally distributed plane inductor 101, almost the same electro-magnetic phenomenon as a case of no insulator 103 is generated by thinness of the insulator 103. Therefore, the present invention includes a case where the two-dimensionally distributed plane inductor 101 is covered with the insulator 103.

Figure 11:
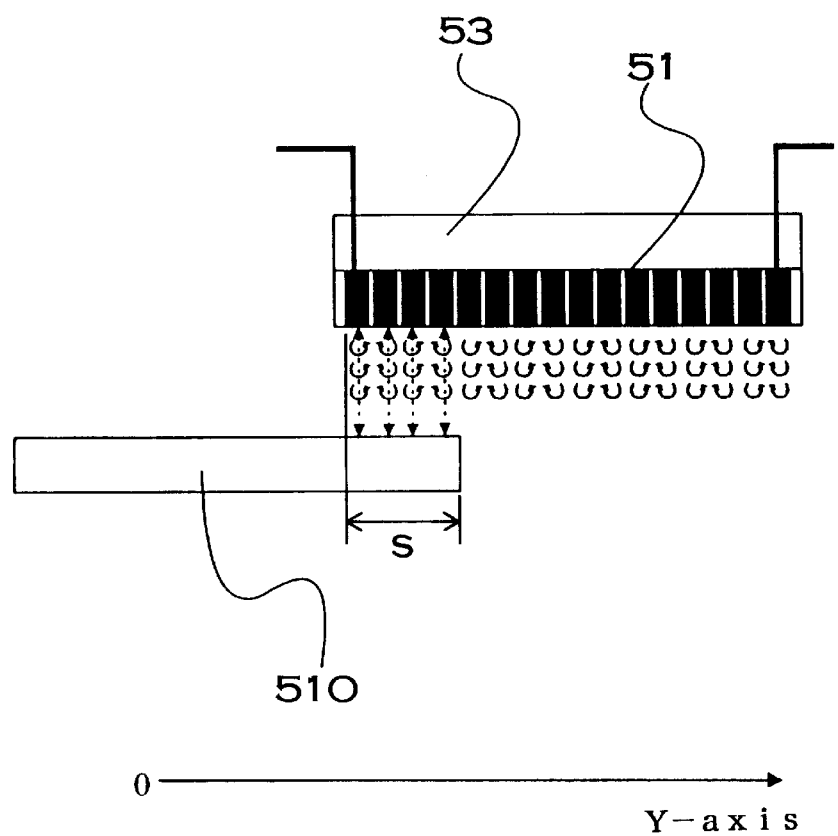
FIG. 11 is a cross-sectional view showing a case where conductive material moves horizontally with respect to the plane inductor of the integrated circuit for measuring the distance in FIG. 5.

Next, a case where the conductive material moves in parallel to the two-dimensionally distributed plane inductor is considered. As shown in FIG. 11, when the conductive material 510 moves in parallel with respect to the two-dimensionally distributed plane inductor 51 in the Y-axial direction, an overlapping area between the two-dimensionally distributed plane inductor 51 and the conductive material 510 is varied. In the overlapping region S between the two-dimensionally distributed plane inductor 51 and the conductive material 510, the conductive material 510 is electro-statically coupled to the two-dimensionally distributed plane inductor 51. Accordingly, the distributed capacitor 511 is generated in the overlapping region S, the current flows in the conductive material 510 and the two-dimensionally distributed plane inductor 51, and then the conductive material 510 is electro-statically coupled with the two-dimensionally distributed plane inductor 51. As a result, the inductance L of the two-dimensionally distributed plane inductor 51 is varied equivalently.

Figure 12:
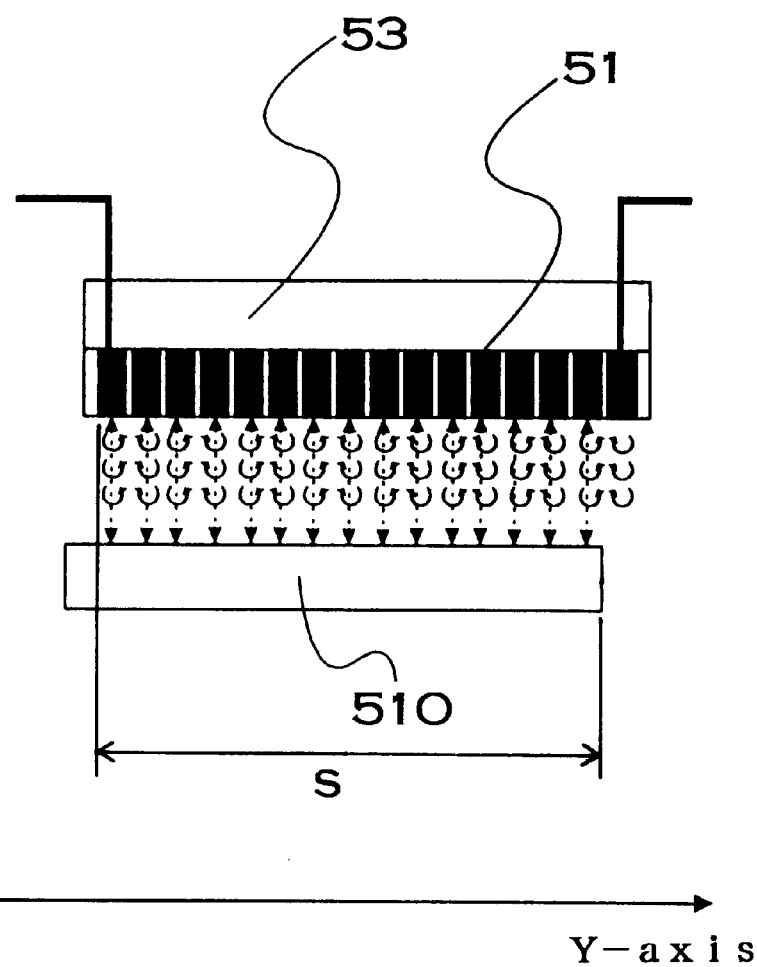
FIG. 12 is a cross-sectional view showing a case where the conductive material in FIG. 11 moves horizontally further with respect to a plane inductor and widely overlaps with the plane inductor.

Therefore, as shown in FIG. 12, when the overlapping region S is increased, the frequency f of the oscillator is increased in accordance with Eq. (1). Accordingly, the variation of the overlapping region S between the two-dimensionally distributed plane inductor 51 and the conductive material 510 can be detected by measuring the variation of the frequency f of the oscillator. Namely, variation in the relative position of the conductive material 510 and the two-dimensionally distributed plane inductor 51 can be detected by measuring the variation in the frequency f of the oscillator. Even in a case where the overlapping area S is varied by varying the relative position of the conductive material 510 and the two-dimensionally distributed plane inductor 51, in substance, the distance between the conductive material 510 and the two-dimensionally distributed plane inductor 51 is varied. Consequently, the integrated circuit for measuring the distance of the present invention can be applied to the case where the overlapping area is varied.

Figure 13:
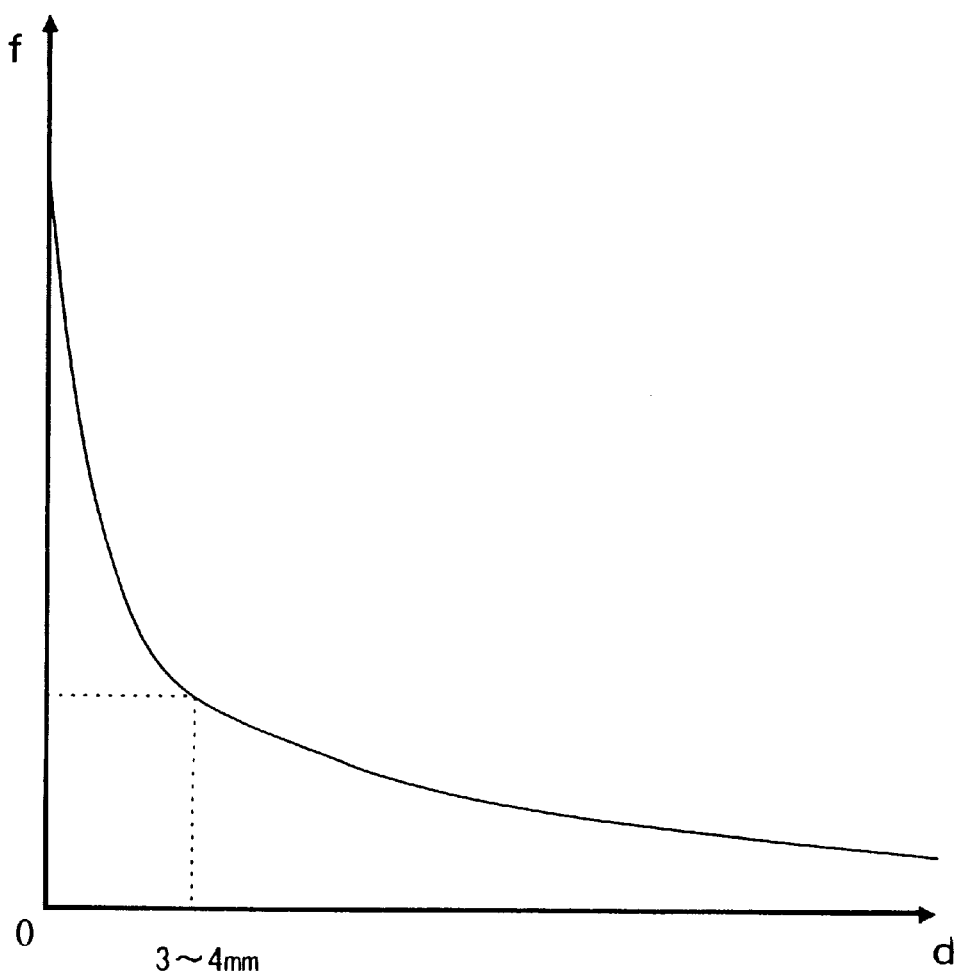
FIG. 13 is a graph showing the relation between the distance d and a frequency f of an oscillator in the integrated circuit for measuring the distance of the present invention.

As shown in FIG. 5, the distance between the conductive material 510 and the two-dimensionally distributed plane inductor 51 is represented by d. The relation between the frequency f of the oscillator and the distance d is shown in FIG. 13. In this figure, when the distance d is less than 3 mm to 4 mm, the frequency f of the oscillator is increased drastically. When applying the integrated circuit for measuring the distance of the present invention to a robot and a position detector, the high measurement sensitivity can be obtained by using it in a region where the frequency f of the oscillator is varied drastically with respect to the very small variation in the distance d.

As shown in FIG. 13, when the distance between the conductive material 510 and the two-dimensionally distributed plane inductor 51 is reduced, the inductance L of the two-dimensionally distributed plane inductor 51 is decreased equivalently and the frequency f of the oscillator is increased. Namely, in the integrated circuit for measuring the distance of the present invention, the distance d between the conductive material 510 and the two-dimensionally distributed plane inductor 51 can be precisely detected by measuring the frequency f of the oscillator with the frequency counter.

In an apparatus which uses the frequency counter for measuring the frequency of the integrated circuit for measuring the distance, the digital signal output from the integrated circuit for measuring the distance can be measured by the frequency counter. Therefore, when an object for measurement is moved with attached to the two-dimensionally distributed plane inductor 51 of the integrated circuit for measuring the distance of the present invention, the moving distance of the object can be operated digitally. Further, when the object for measurement is moved with attached to the conductive material 510, the moving distance of the object can be measured digitally.

In general, since the distance is measured by operating and processing the signals from the integrated circuit for measuring the distance with a digital computer, the signals from the integrated circuit for measuring the distance of the present invention can be directly input to the computer using the digital signal. A prior art apparatus for measuring the distance, which outputs the analog signal, requires quantization process by using A/D converters through an amplifying circuit in order to input them to the computer.

In comparing a digital apparatus for measuring the distance and an analog apparatus for measuring the distance, the digital apparatus for measuring the distance has the following features.

(1) An amplifier and an A/D converter are not required in the digital measurement apparatus, and therefore the total cost of digital systems is not expensive.

(2) The digital signals which are output from the integrated circuit for measuring the distance are not affected by noises, therefore the measured values are stable and reliable even though an output line is long.

(3) All of the integrated circuits for measuring the distance can be designed to be digital circuits, and therefore the implementation for the integrated circuit for measuring the distance can be easily realized.

Figure 14:
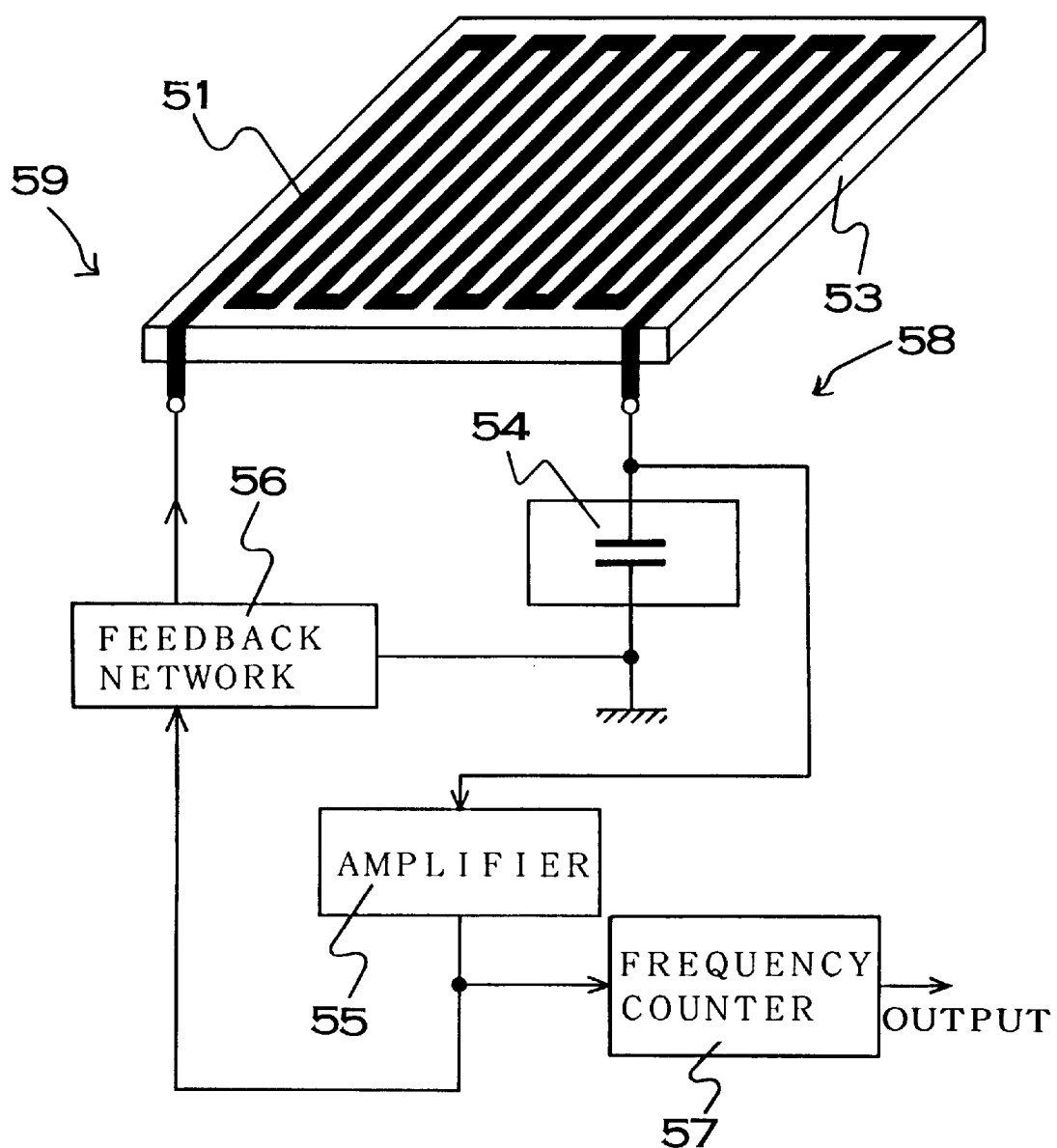
FIG. 14 is a block diagram showing an example of the integrated circuit for measuring the distance of the present invention.

FIG. 14 shows a block diagram of an example of the integrated circuit for measuring the distance using the two-dimensionally distributed plane inductor 51. A lump capacitor 54 is connected in series to form a LC circuit 58. A signal from the LC circuit 58 is input to an amplifier 55. Signals output from the amplifier 55 are input to a feedback network 56 and a frequency counter 57.

A signal output from the feedback network 56 is positively feedbacked to the two-dimensionally distributed plane inductor 51 to form an oscillator 59. The signal of the integrated circuit for measuring the distance of the present invention is output from the frequency counter 57.

Figure 15:
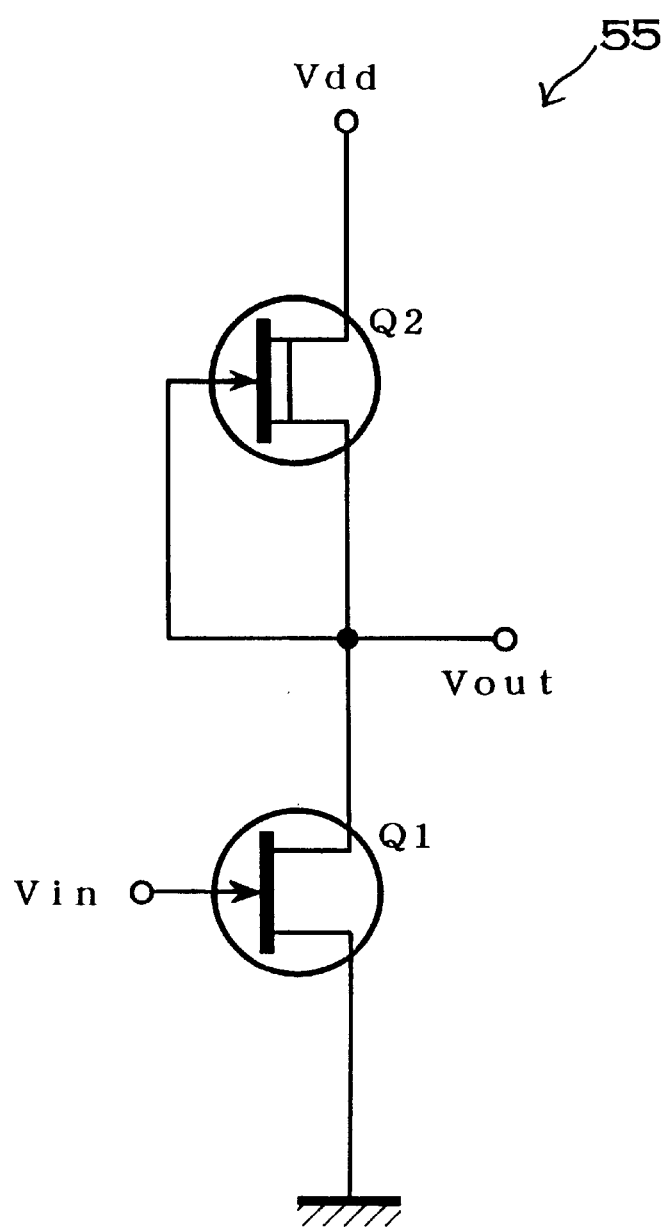
FIG. 15 is a circuit diagram showing an example of an amplifier used for the integrated circuit for measuring the distance in FIG. 14.

FIG. 15 shows an example of the amplifier 55 of the integrated circuit for measuring the distance shown in FIG. 14. The amplifier 55 has an input Vin and an output Vout. The input Vin is input to a gate of a driving transistor Q1, and a loading transistor Q2 is connected to a drain of the driving transistor Q1. A drain of the loading transistor Q2 is connected to a power-supply voltage Vdd, and a source of the loading transistor Q2 is the output Vout. A signal input to the input Vin is amplified and output from the output Vout. All kinds of transistors such as a bipolar transistor and a field effect transistor can be used for the integrated circuit for measuring the distance of the present invention, and the kind of transistors is not specified. Further, an operational amplifier can be substituted for the amplifier of the integrated circuit for measuring the distance of the present invention.

Figure 16:
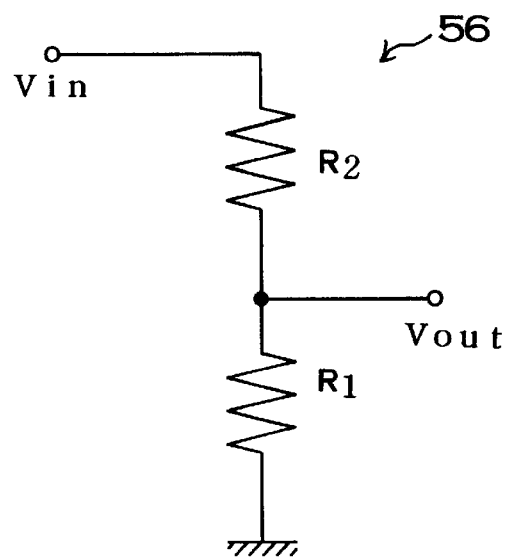
FIG. 16 is a circuit diagram showing an example of a feedback network used for the integrated circuit for measuring the distance in FIG. 14.

FIG. 16 shows an example of the feedback network 56 using resistances of the integrated circuit for measuring the distance shown in FIG. 14. The feedback network 56 comprises resistances R1 and R2. A signal input to Vin of the feedback network 56 is attenuated and output from Vout.

Figure 17:
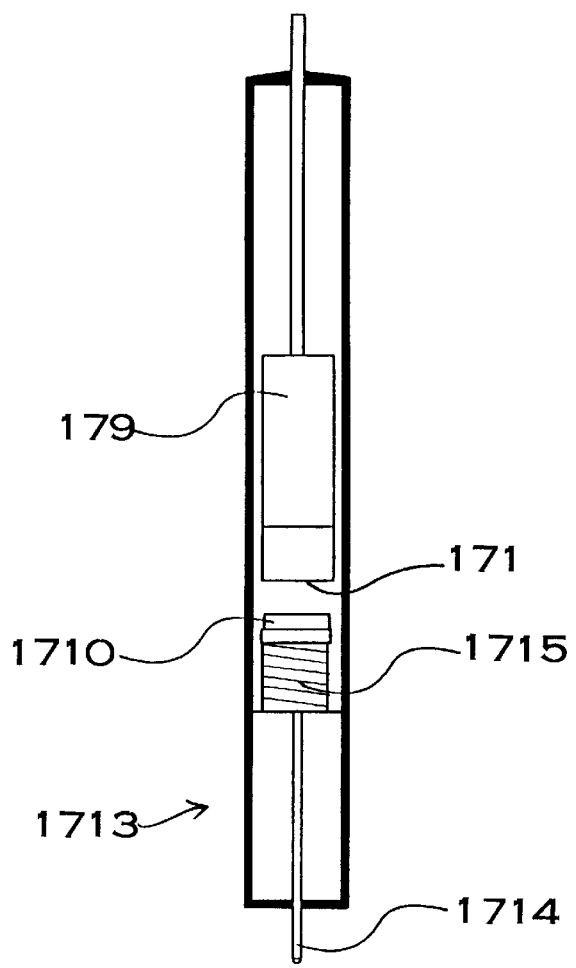
FIG. 17 is a cross-sectional view showing an example of the structure of a pen of the first embodiment of the integrated circuit for measuring the distance of the present invention.

Turning to FIG. 17, an example of a case where the integrated circuit for measuring the distance of the present invention is used for an electric pen is shown. The electric pen 1713 in this figure detects the position of a position detecting rod 1714 with the integrated circuit for measuring the distance. The electric pen 1713 is provided with the integrated circuit for measuring the distance which comprises the conductive material 1710 of a metal plate, the position detecting rod 1714 moving in the axial direction, an elastic body 1715 for elastically pushing the position detecting rod 1714 downward in this figure and the two-dimensionally distributed plane inductor 171.

The integrated circuit for measuring the distance is provided with the two-dimensionally distributed plane inductor 171 facing downward in this figure. The conductive material 1710 is fixed to the tip of the position detecting rod 1714. A part of the elastic body 1715 is connected to the position detecting rod 1714. When the position detecting rod 1714 is applied pressure, and thereby moving upwards, the elastic body 1715 extends and elastically pulls the position detecting rod 1714 downward. When the conductive material 1710 moves up and down, the distance between the two-dimensionally distributed plane inductor 171 and the conductive material 1710 is varied. Therefore, the frequency f of an oscillator 179 provided within the integrated circuit for measuring the distance is varied. The pressure, which is converted into the up-and-down position variation in the position detecting rod 1714 by the elastic body 1715, can be detected by measuring the frequency of the oscillator 179 with the frequency counter provided inside or outside of the integrated circuit for measuring the distance. For this reason, the electric pen 1713 can detect stylus pressure by measuring the pressure applied to the position detecting rod 1714. Consequently, both stylus pressure and pen tracing trajectory can be detected by using the electric pen 1713 with a position digitizer.

The integrated circuit for measuring the distance of the present invention is for the purpose of measuring the distance. However, as shown in FIG. 17, the integrated circuit for measuring the distance can also measure pressure with the elastic body 1715 due to easy conversion from displacement to pressure. A spring and a rubber are practical examples of the elastic body 1715.

Figure 18:
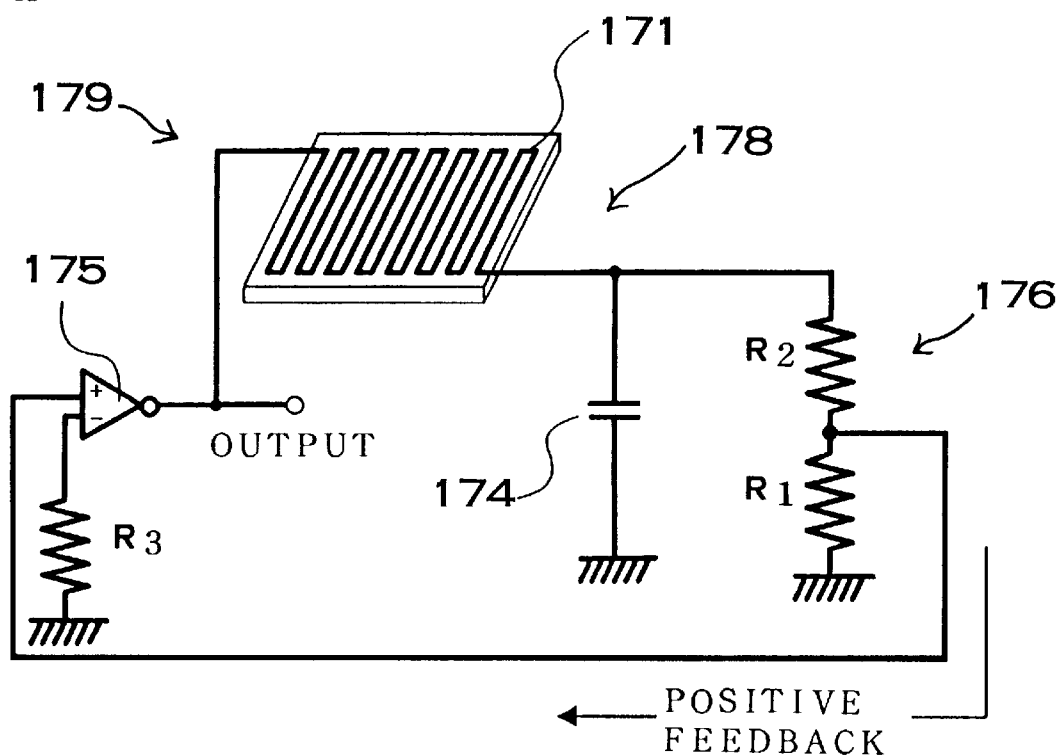
FIG. 18 is a circuit diagram showing an example of an oscillator housed in an electric pen in FIG. 17.

FIG. 18 shows a circuit diagram of the integrated circuit for measuring the distance housed in the electric pen shown in FIG. 17. In the integrated circuit for measuring the distance as shown in this circuit diagram, the two-dimensionally distributed plane inductor 171 and the lump capacitor 174 are connected in series to form the LC circuit 178. The output of the LC circuit 178 is input to the feedback network 176. The feedback network 176 comprises the resistances R1 and R2. The output of the feedback network 176 is amplified by the amplifier 175 and feedbacked positively. The negative feedback terminal of the amplifier 175 is grounded by a resistance R3. The output from the amplifier 175 is added to the two-dimensionally distributed plane inductor 171.

Figure 19:
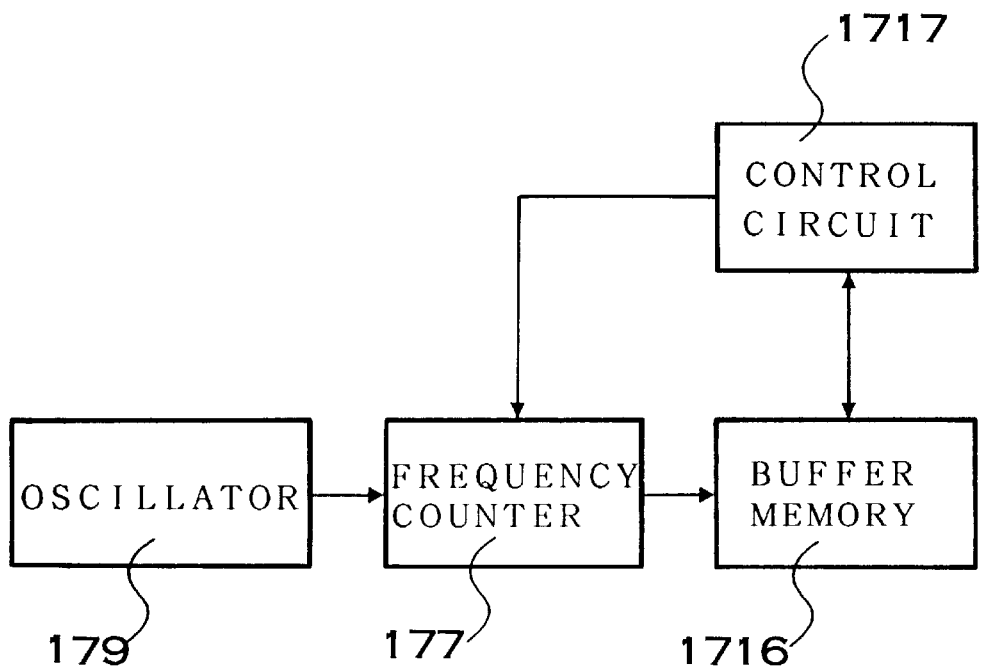
FIG. 19 is a block diagram for detecting the position of a position detecting tip housed in the pen in FIG. 17.

FIG. 19 shows a block diagram in a case where the position of the position detecting rod 1714 housed in the electric pen 1713 in FIG. 17 is detected by using the integrated circuit for measuring the distance in FIG. 18. The block diagram includes the oscillator 179, the frequency counter 177, a buffer memory 1716 and a control circuit 1717. When the position detecting rod 1714 of the electric pen 1713 is applied pressure and moved upward, the frequency f of the oscillator 179 housed in the integrated circuit for measuring the distance is varied. The frequency f is measured by means of the frequency counter 177, and the measured data is stored in the buffer memory 1716. The frequency counter 177 and the buffer memory 1716 are controlled by the control circuit 1717. The stylus pressure applied to the electric pen 1713 can be measured by reading the data stored in the buffer memory 1716.

Figure 20:
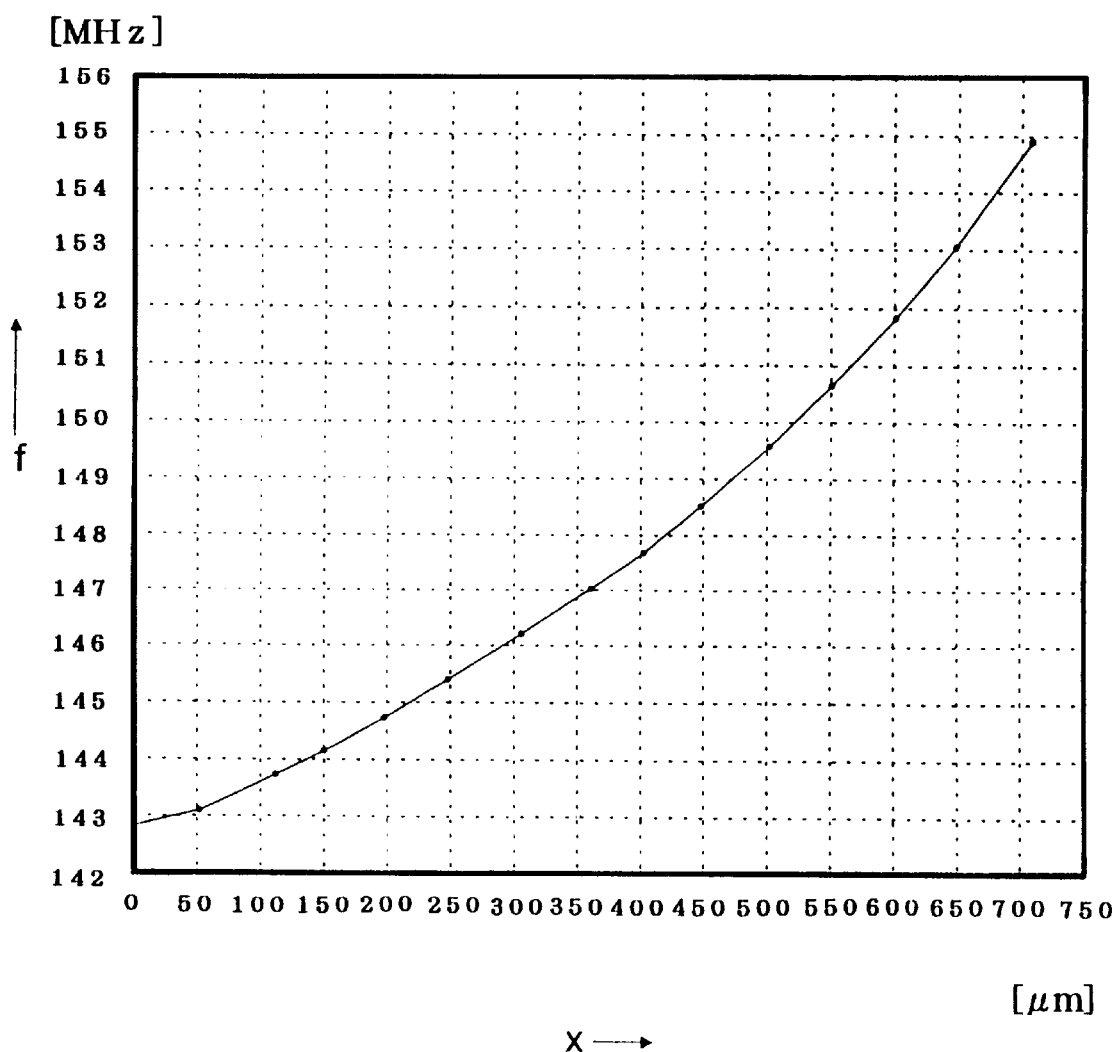
FIG. 20 is a graph showing the relation between the departure distance x from a reference point of conductive material and a frequency f of an oscillator in the integrated circuit for measuring the distance of the present invention.

FIG. 20 shows an experimental result of applying the integrated circuit for measuring the distance of the present invention to detect the relative position of the two-dimensionally distributed plane inductor and the conductive material. A departure distance which is measured from the reference point of the conductive material 1710 is represented by a symbol x and defined by the following equation:

$$d+x=c$$

(where C is constant); therefore, when the departure distance x from the reference point is increased, the distance d is decreased. The relation between the departure distance x and the frequency f of the oscillator 179 housed in the integrated circuit for measuring the distance is shown in FIG. 20. FIG. 20 shows a experimental result of a case where the value of c is 1000 $\mu$m. In the electric pen 1713 shown in FIG. 17, if the conductive material 1710 approaches the two-dimensionally distributed plane inductor 171 by applying pressure to the position detecting rod 1714, the departure distance x is increased and the distance d is decreased, As a consequence, the frequency f of the oscillator 179 is increased. As shown in FIG. 20, when the distance x is varied from 0 to 700 $\mu$m, the frequency of the oscillator increases 11.8 MHz, therefore the resolution of the counter output is 11,800,000, which is extremely large.

Accordingly, in the electric pen 1713, the digital output of the integrated circuit for measuring the distance of the present invention is changed remarkably when a position of the position detecting rod 1714 is varied a little. Hence, the integrated circuit for measuring the distance of the present invention can detect the position displacement or pressure variation of the position detecting rod 1714 with high sensitivity.

Figure 21:
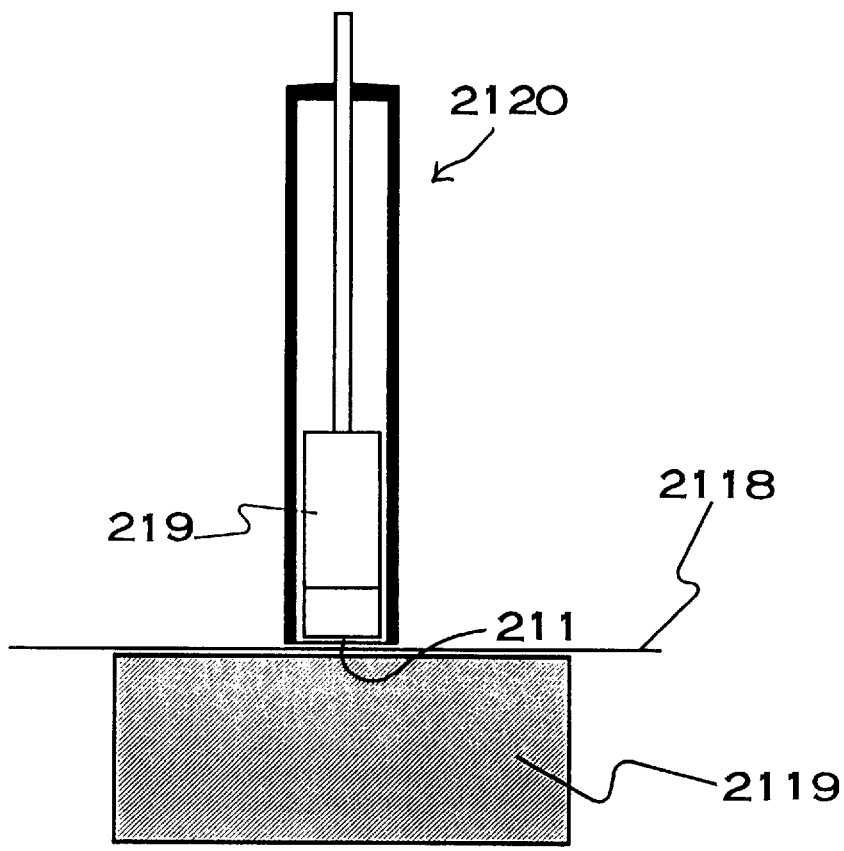
FIG. 21 is a cross-sectional view showing the structure of a film thickness measuring device of the second embodiment of the integrated circuit for measuring the distance of the present invention.

A film thickness measuring apparatus 2120 shown in FIG. 21 is described below as the second application of the integrated circuit for measuring the distance of the present invention. The film thickness measuring device 2120 is for the purpose of measuring the thickness of a thin film 2118 such as a film sheet with high precision. The two-dimensionally distributed plane inductor 211 of the integrated circuit is contacted with the thin film 2118 located on a metallic stand 2119 as the conductive material. A distance between the two-dimensionally distributed plane inductor 211 and the metallic stand 2119 is equal to the thickness of the thin film 2118. Therefore, it is possible to measure the thickness of the thin film 2118 because the distance between the two-dimensionally distributed plane inductor 211 and the metallic stand 2119 is measured by the frequency variation of the oscillator 219. At least 10,000,000 resolution by 1 second measurement can be obtained because the used frequency is about 100 MHz. Moreover, it is easy to control the film pressure and manage the measured data with a computer due to the digital output of the film thickness measuring apparatus 2120. For this reason, the integrated circuit for measuring the distance of the present invention can be widely utilized in the industrial fields.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An integrated circuit for measuring a distance comprising:

an oscillator housed in a package of an integrated circuit; and a plane inductor provided on the surface of a package of the integrated circuit housing the oscillator; and connected to the oscillator so as to specify a frequency of the oscillator, wherein if conductive material approaches the surface of the package of the integrated circuit, the frequency of the oscillator is varied by means of the plane inductor so as to detect the approaching distance of the conductive material.

2. An integrated circuit for measuring the distance as recited in claim 1, wherein the frequency of the oscillator is greater than 30 MHz.

3. An integrated circuit for measuring the distance as recited in claim 1, wherein the oscillator comprises an operational amplifier, a capacitor and the plane inductor.

4. An integrated circuit for measuring the distance as recited in claim 1, wherein the plane inductor is an inductor of meander type.

5. An integrated circuit for measuring the distance as recited in claim 1, wherein the plane inductor is an inductor of spiral type.

6. An integrated circuit for measuring the distance as recited in claim 1, wherein a terminal of the plane inductor is connected to a pin of the integrated circuit.

7. An integrated circuit for measuring the distance as recited in claim 1, wherein a two-dimensionally distributed plane inductor is located on an insulator provided on the upper surface of the package of the integrated circuit.

8. An integrated circuit for measuring the distance as recited in claim 1, wherein the surface of the plane inductor is covered with an insulator.

9. An integrated circuit for measuring the distance as recited in claim 1, wherein the integrated circuit for measuring the distance is provided with a frequency counter for detecting the frequency of the oscillator and outputting digital signals.

10. An integrated circuit for measuring the distance as recited in claim 1, wherein the oscillator is provided with an amplifier and a feedback network for feedbacking an output of the amplifier.

11. An integrated circuit for measuring the distance as recited in claim 10, wherein the feedback network comprises resistances.

12. An integrated circuit for measuring the distance as recited in claim 10, wherein the amplifier comprises a transistor.

* * * * *